Nov. 22, 1960 J. C. WHITESELL 2,960,735
FOUNDRY SYSTEM
Filed June 6, 1957 7 Sheets-Sheet 3

Inventor.
John C. Whitesell

Nov. 22, 1960 J. C. WHITESELL 2,960,735
FOUNDRY SYSTEM
Filed June 6, 1957 7 Sheets-Sheet 4

Inventor.
John C. Whitesell.
By Joseph O. Long
Atty.

United States Patent Office 2,960,735
Patented Nov. 22, 1960

2,960,735
FOUNDRY SYSTEM

John C. Whitesell, Chicago, Ill., assignor to Crane Co., Chicago, Ill., a corporation of Illinois Filed June 6, 1957, Ser. No. 664,022

7 Claims. (Cl. 22—20)

The present invention relates generally to a foundry system, and more particularly to such a system which is substantially fully automatic in operation.

Various mechanized arrangements for performing certain operations in the production of castings have been suggested, and foundary systems facilitating steps in a molding operation have been developed, but such known arrangements have various drawbacks, including the necessity of considerable manual handling of flasks, patterns, and molds.

The present invention provides a substantially fully automatic foundry system with automatically operating mold operation stations located along an endless or closed circuit conveyor which moves a succession of flasks permanently mounted thereon through or past the stations for automatic performance of the molding operations. These operations may vary with different applications of the invention, but typically may include the filling of a cooperable pair of separated cope and drag flasks with molding sand and julting and pressing thereof to form a part of a mold cavity in each flask from an appropriate pattern, the insertion of cores in the drag flask, the bringing of the flasks into superimposed relation, closing of the flasks to provide a complete mold, pouring molten material into the mold while holding the flasks against separation, cooling the molds, shaking out the sand, opening the closed mold and removing the casting, and separating the flasks for movement to the molding station for repetition of the cycle.

The invention eliminates manual handling of molding flasks, since the flasks are permanently mounted as parts of the conveyor system, and each pair of flasks cooperable to provide a complete mold is mechanically brought to separated and closed condition at the proper points in the travel thereof. This obviates the cumbersome and unsafe handling of flasks in assembling, disassembling, and moving a complete mold manually or by various mechanized transfer or handling means. Another important advantage is the high production rate achievable by the smoothly moving, uninterrupted succession of molds, limited only by the time required for the slowest operation performed. The number of workmen required may be very greatly reduced because of the entirely automatic handling of the flasks and also because all or any of the several operations are or may be automatically performed.

It is accordingly an object of the invention to provide a substantially fully automatic foundry system eliminating manual handling of molding flasks.

Another object is the provision of a substantially fully automatic foundry system permitting manual performance of selected operations.

Another object is the provision of means for automatically separating from and bringing into superimposed relation pairs of cooperable molding flasks.

Another object is the provision of means for automatically bringing into precisely registered and closed condition pairs of superimposed molding flasks to define complete molds.

A further object of the invention is the provision in a conveyor line of a carrier permanently mounting a pair of cooperable mold flasks for movement relative to each other in the same plane transverse of the conveyor line for superimposition and closing to define a mold and for separation for casting removal and formation of a mold cavity in each.

It is also an object of the invention to provide a mounting connection for a mold flask in a flask carrier of a conveyor which provides for limited pivotal and sliding movement of the flask relative to the carrier in a plane transverse of the conveyor.

Another object is the provision of a mold flask having trunnions for limited pivotal connection in a carrier for movement by a conveyor.

Still another object is the provision of a mold flask for mounting in limited pivotal relation in a carrier by trunnions permitting limited sliding movement thereof in the carrier.

A further object is the provision of means for holding in tightly closed condition a pair of superimposed molding flasks forming a mold during movement thereof along a pouring station.

Another object is the provision of a plurality of mold carriers in a conveyor each mounting a pair of flasks cooperable to form a complete mold, and of rail means cooperating therewith for guiding and supporting the flasks and carriers.

Another object is the provision of a foundry system in which pairs of mold flasks cooperable to form complete molds are permanently mounted on conveying means and automatically brought to closed, complete mold condition and opened to separated condition.

A further object is the provision of a foundary system in which mold flasks are permanently mounted on conveying means in pairs cooperable to form complete molds.

Other and further objects, advantages, and features of the invention will be apparent to those skilled in the art from the following detailed description and the accompanying drawings, in which:

Figure 1:
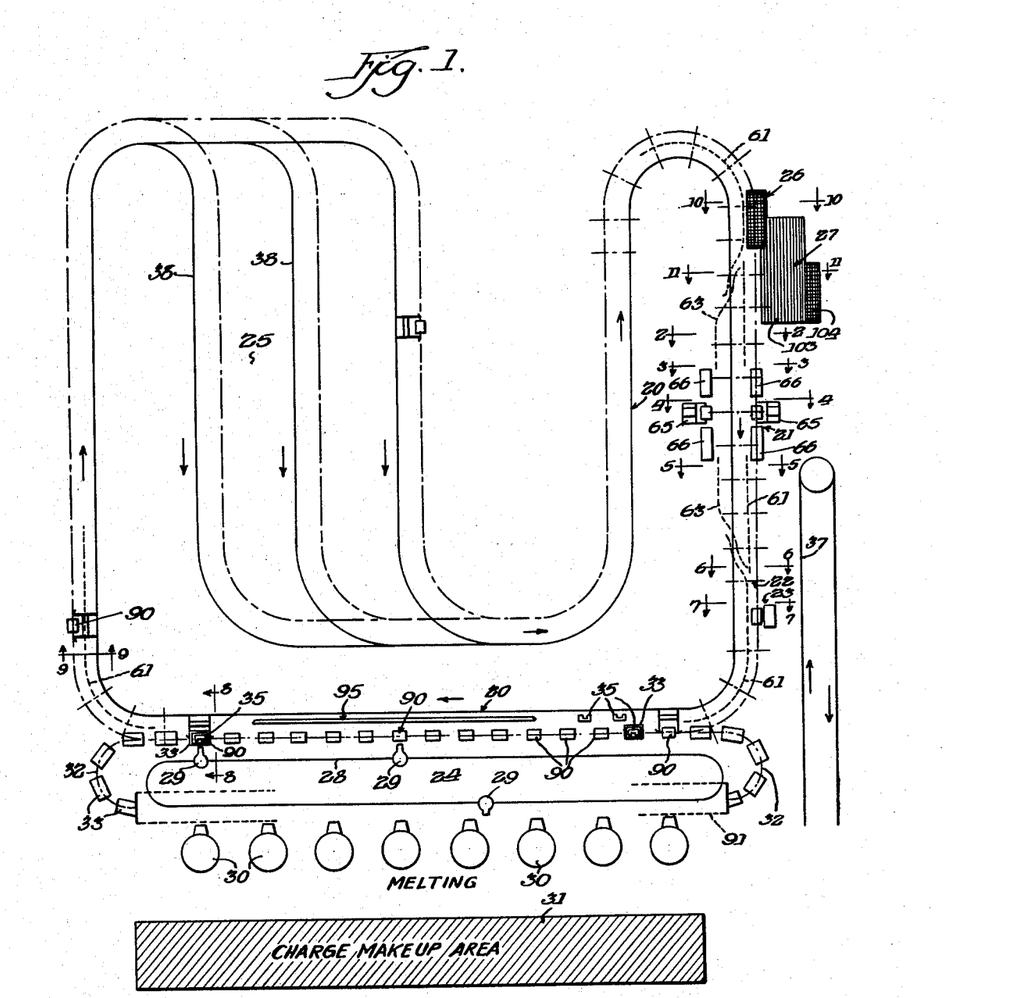
Fig. 1 is a diagrammatic plan view showing an illustrative application of the invention with one possible arrangement of the conveyor and stations.

Referring to Fig. 1, there is shown diagrammatically a plan of one foundry system embodying the invention. An endless conveyor generally designated 20 is provided which passes through a molding station 21, past a core setting station 22, a mold closing station 23, along a pouring station 24, and through a cooling and storage station 25 to a mold shakeout station 26 and a casting removal station 27, from which it returns to the molding station 21 to repeat the cycle. At the pouring station 24, an endless conveyor 28 is provided having a run paralleling the run of the conveyor 20 and carrying a plurality of pouring ladles 29, only some of which are shown. Along the return run of the conveyor 28 is a melting area comprising a plurality of crucibles 30, from which the ladles 29 may be filled. At a location convenient to the melting area is a charge makeup area 31 to which the various materials employed in providing the desired molten metal may be brought in any suitable manner for melting in the crucibles. As described more in detail hereinafter, an endless track 32 may be arranged along the pouring station 24 on which runs an endless train of carriages 33 spaced and timed so that each may support a mold during the travel of the molds along the pouring station, one run of the track extending along and below the line of closed molds passing the station. At the pouring station 24, there is also preferably provided an endless conveyor 34 (Fig. 8) having one run above the carrying run of tracks 32 and a return run at a higher level above the hanger frames on which the molds are mounted. Conveyor 34 carries a plurality of flat weights 35 and is arranged to bring a weight 35 to rest upon each mold as it comes to the pouring station and to raise the weights from the molds as the latter leave the station. Each weight 35 is formed with an edge recess 36 to leave the sprue opening of the mold free for receiving the molten metal. A core conveyor 37 may be provided to carry cores from a core room to the core setting station 22. The conveyor 20 preferably includes one or more shunts 38 which by-pass the main conveyor path and provide means for holding for storage or for prolonged cooling any desired number of molds.

Figure 2:
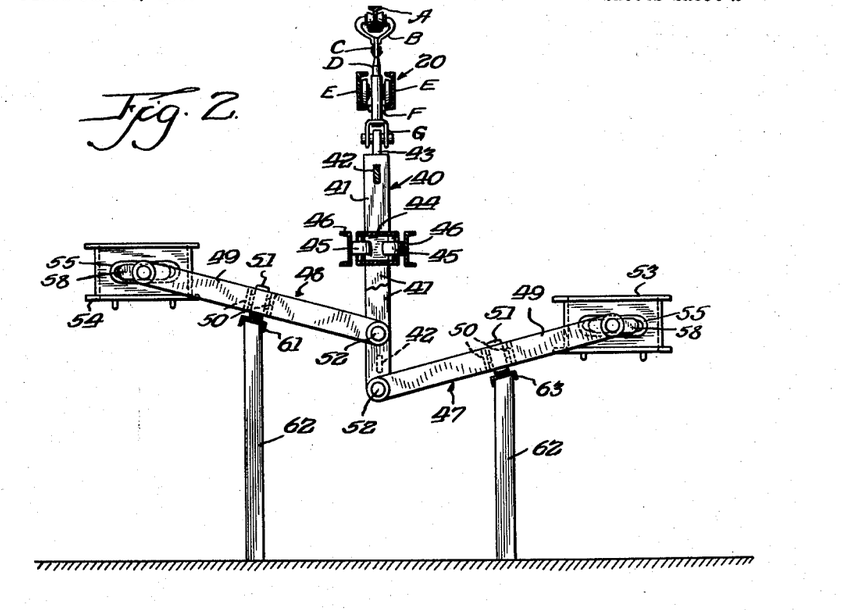
Figs. 2 to 11 inclusive are transverse sectional views respectively taken substantialy on the lines 2—2 to 11—11 of Fig. 1, each showing in end elevation a pair of mold flasks in a carrier in different positions at the indicated locations along the conveyor.

In the present instance, the conveyor 20 is shown as of the overhead type, specifically the type known as a power and free trolley conveyor. While this conveyor is employed for purposes of illustration, it is to be understood that other types of conveyors may be employed. Referring specifically to Fig. 2, the conveyor comprises a track A, in this case shown as an I-beam, mounted at a desired elevation and extending in an endless or closed circuit arrangement to define the path of the conveyor. A plurality of power trolleys B run on the track, each depending from rollers bearings on the beam. A suitable driving chain C connects the trolleys B, and is suitably driven step-by-step to move the trolleys along the track. A pusher or lug D extends downwardly from each power trolley B. Below the track A are disposed a pair of channels E which are suitably mounted in parallel spaced relation with their webs vertical and their flanges directed toward each other to provide a track on which a plurality of free trolleys F travel. Each trolley F has rollers engaged in the channels, and is provided with upwardly directed dogs pivotally arranged for engagement by the pushers D of the power trolleys. The arrangement is such that the free trolleys may be engaged with the power trolleys for movement by conveyor chain C and may be disengaged when desired so as to remain at a desired location or be moved by other means. Each trolley F extends below the channel members E and has secured to its lower portion a clevis G. The free trolleys F are arranged in spaced pairs, with each pair supporting a mold carrier generally designated 40.

Figures 13, 14, 15, 16:
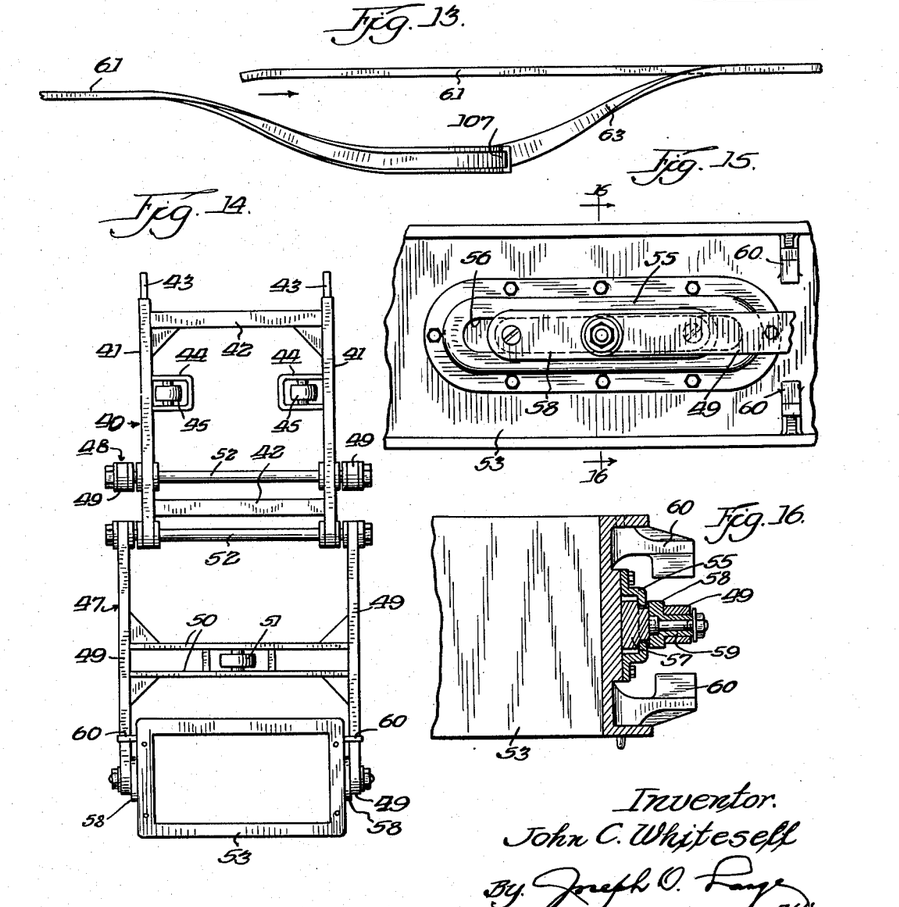
Fig. 13 is a broken side elevation of the portion of the supporting rail arrangement shown in Fig. 12.
Fig. 14 is a side elevation of a flask carrier supporting one of the flasks in a vertically depending position.
Fig. 15 is an enlarged fragmentary end elevation of a flask showing its connection to a carirer.
Fig. 16 is a sectional view taken substantially on the line 16—16 of Fig. 15.

The construction of each carrier 40 will be clear from reference to Figs. 2 and 14. The carrier comprises a hanger frame which includes a pair of vertical members 41 connected by horizontal members 42 and having swivels 43 at their upper ends secured to the pins of the clevises G of a pair of free trolleys F. By this arrangement, each hanger frame may more readily move upward and downward and around curves as determined by the arrangement of the supporting track. Secured to each vertical member 41 of the hanger frame, as by welding, is a U-bracket 44 in which are rotatably mounted rollers 45 adapted to engage against guide rails 46 which are arranged below and parallel to the trolley tracks, and comprise a pair of laterally spaced channel members arranged with their webs vertical for engagement by the rollers 45, and with their flanges out-turned. The guide rails 46 prevent any considerable lateral movement of the carriers 40. On each hanger frame are pivoted a pair of flask supporting frames 47 and 48. Each frame 47 and 48 comprises a pair of parallel arms 49 connected intermediate their ends by laterally spaced rigid members 50 between which roller means 51 may be journalled on an axis substantially parallel to the arms. A single roller is shown as the roller means, but more may be employed. A pair of shafts 52 are supported in vertically spaced relation by the lower ends of the members 41 of the hanger frame, each receiving on its ends what may be termed the inner ends of the arms 49 of one of the supporting frames so that the latter may pivot in a plane transverse of the hanger plane. At their outer or free ends, the arms 49 of support frames 47 and 48 are connected respectively to a drag flask 53 and cope flask 54 in limited slidable and pivotal relation. Each of the flasks has the usual locating pins and apertures for assuring proper registration of the flasks when closed.

One possible construction for mounting the flask in the supporting frame is illustrated in detail in Figs. 15 and 16. To each end of the flask 53 there is bolted or otherwise secured an elongated saddle plate 55 with a raised central portion in which is a slot 56. A slide 57 is disposed between the plate and the end of the flask with a reduced neck portion engaged in the slot. The slide and the reduced portion are somewhat shorter than the plate 55 and slot 56 respectively, so that the slide may move a predetermined distance transversely of the flask. Secured to the outer surface of the reduced portion of the slide is a plate 58 somewhat wider than the slot 56, so as to define with the slide 57 a groove receiving the slot-defining edges of the plate 55. Integral with the plate 58 is a projecting trunnion 59 on which the adjacent arm 49 of the supporting frame is pivoted. Formed or secured on the end of the flask are a pair of stops 60 so located that one or the other is engaged by the arm 49 upon relative rotation of the flask and arm in one or the other direction. By this arrangement, the flask is permitted a predetermined amount of sliding movement and a predetermined degree of pivotal movement relative to the supporting frame. As will hereinafter appear, this permits the two flasks mounted on each carrier to be brought into precise registry and tight engagement with each other. Other means might of course be provided to achieve this result. The mounting connection is indicated in Fig. 2, but is omitted in other figures for clearness.

To avoid any possible interference of one of the flask supporting frames with the other, the frame 47 is pivoted at the lower extremity of the hanger frame, and the frame 48 at a somewhat higher level. The frame 47 supports the drag flask, while the frame 48 carries the cope flask. A support rail 61, which is shown as a channel member, is provided for engagement by the roller means 51 of the flask support frame 48 to support the weight of the frame and flask and to determine the planes thereof, or in other words the level of the flask. The rail 61 is supported in any suitable manner, as by standards 62 extending from the floor. The support rail 61 extends parallel to the path of the conveyor 20 throughout substantially the entire extent thereof, as indicated in Fig. 1, except as it may be found convenient to interrupt it at certain of the mold operating stations. A similar support rail 63 is provided for the flask supporting frame 47 and the drag flask 53, but extends for only a relatively short distance, substantially from the shakeout station 26 to the mold closing station 23, as also indicated in Fig. 1, and is interrupted at the molding station 21. As hereinafter more fully explained, the supporting rails are at certain locations formed to provide for bringing the drag and cope flasks into superimposed relation so that they may be closed to form a complete mold for producing a casting or brought to separated position for removal of a casting therefrom and formation of mold cavities therein. The flasks travel in superimposed closed position through the major portion of the conveyor path.

Figure 3:
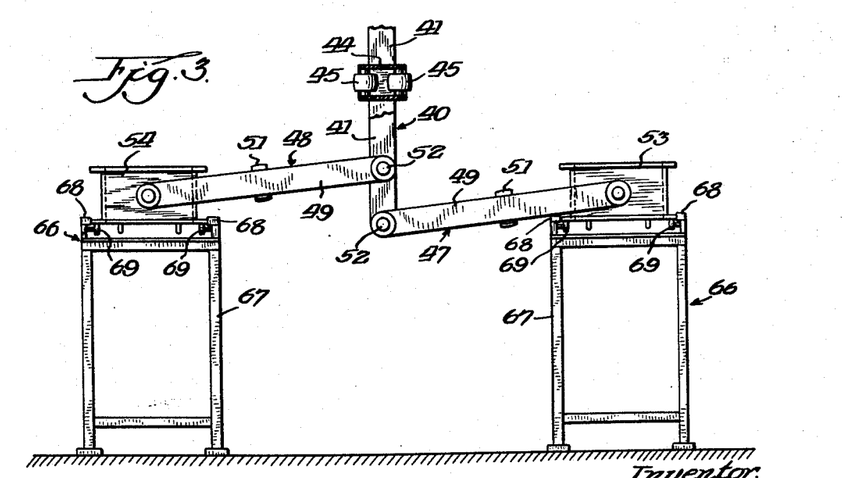

Beginning with two flasks in the separated condition on opposite sides of the conveyor as shown in Fig. 2, the flasks of each carrier are moved forwardly to the molding station 21 by operation of the conveyor 20, which as previously explained is driven in a step-by-step movement. The movement of the conveyor is timed so that the pauses are each long enough to allow performance of the longest operation which must be carried out while the conveyor is stationary. The molding station comprises a pair of molding machines generally designated 65, one on each side of the conveyor 20 in the path of movement of one of the flasks 53 and 54. Each molding machine is disposed between a pair of forward and rear guide conveyors generally designated 66 on which the flasks travel before and after being positioned in the molding machine. As shown in Fig. 3, each conveyor 66 comprises a stand 67 extending to a suitable height relative to the molding machine, and having laterally separated edge guides 68 adapted to receive therebetween the lower flange of the flask 53 or 54 and guide the flask longitudinally to the adjacent machine 65. Suitably mounted below and projecting laterally inwardly of the guides 68 are a plurality of rollers 69 on which the flask rides to the molding machine after being deposited on the conveyor by means of the support rails 61 and 63. The rails terminate adjacent the rear guide conveyors 66, and begin again adjacent the forward ends of the forward conveyors 66.

Figure 4:
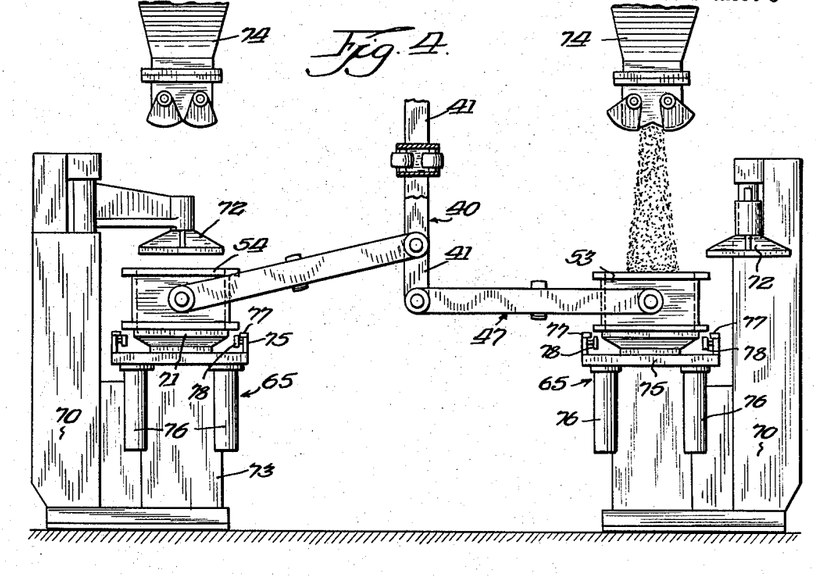

Each of the molding machines comprises a frame 70 on the base of which is mounted a vertically reciprocable bed 71 over which may be swung a squeezer plate 72 pivoted on a vertical portion of the frame. The bed is movable vertically by fluid cylinder means 73, and in its lowermost position is below the level of the guide conveyors 66. Suitably held on the bed is the desired pattern (not shown). Directly above the bed 71 is a sand hopper 74 from which molding sand may be supplied to a flask on the bed when the squeezer plate 72 is swung out of position over the bed, as shown at the right in Fig. 4. A conveyor section 75 is mounted on the frame 70 in vertically movable relation by means of fluid cylinders 76 so that it may be raised to the level of the adjacent conveyors 66 and lowered below the normal level of the bed 71. The conveyor section 75 serves as a stripper and also in effect as an intermediate bridging portion of the forward and rear guide conveyors 66 of the machine 65. The section 75 has edge guides 77 and rollers 78 arranged and operating in the same manner as the guides 68 and rollers 69 of the conveyors 66. Suitable retractable stop means of known type may be provided on the conveyor section to assure precise longitudinal positioning of the flask in the machine, if desired, but are not actually necessary because the conveyor movement brings the flask to the proper position along the path of movement. The guides 77 of course provide for exact lateral positioning. As the flasks 53 and 54 move toward the molding machines 65, they are deposited on the rear guide conveyors 66 by the support rails 63 and 61, respectively, and move over the conveyors onto the sections 75, which are in alignment therewith and in their raised positions. By means of the guides 77, each flask 53 and 54 is located exactly over the bed 71 of the machine to which it is brought, with its locating pins directly over apertures (not shown) provided in the bed to receive the same for proper flask positioning. The conveyor section 75 is then lowered to deposit the flask on the bed surrounding the pattern and with its pins engaged in the apertures, and the hopper 74 is opened to allow a suitable quantity of molding said to fall into the flask therebeneath, the squeezer plate being positioned out of the path of the sand. The flask is then sharply jounced or jolted by reciprocation of the bed 71 through the cylinder 73, preliminary compacting of the sand in the flask being thus accomplished. The squeezer plate 72 is thereupon brought to position over the bed 71 and the flask thereon, and the cylinder means 73 operated to move the bed upwardly to compress the sand in the flask between the bed and plate and thus form the mold cavity. The entire cycle of operation of the molding machine may be automatic, starting upon the flask coming to its predetermined position engaged on the bed 71. A suitable switch or other means for triggering the machine operation may be provided for engagement by the flask as it reaches the predetermined position.

The squeezer plate 72 is then swung to inoperative position and the conveyor section 75 is raised by operation of its cylinders 76 to strip the flask from the pattern and lift it to the level of the forward conveyor 66, onto which it is moved from the section 75 upon the next movement of the conveyor 20. As the flask leaves the forward guide conveyor, its support is resumed by the rail 61 or 63, on which the roller means 51 again engage. It may be noted that the guide rails 46, as well as the support rails, are interrupted at the molding station, since lateral guidance of the carrier 40 is provided by the engagement of the flasks with the edge guides 68 and 77.

Figure 5:
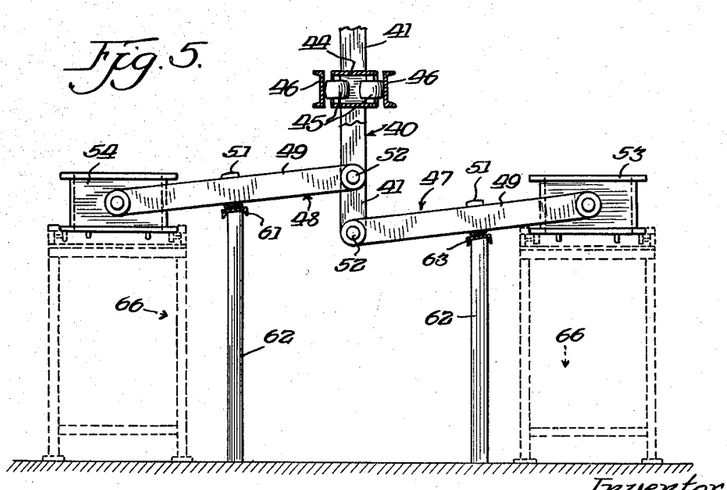
Figure 6:
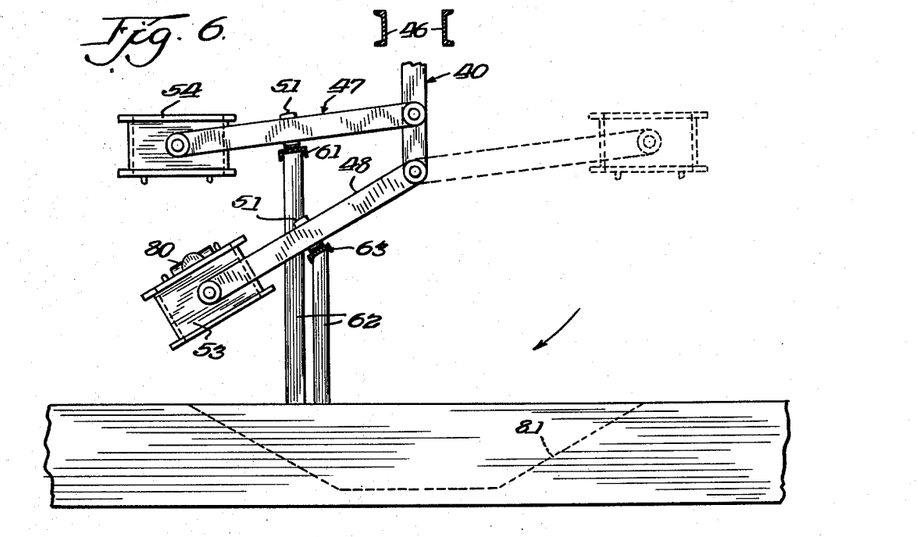
Figure 7:
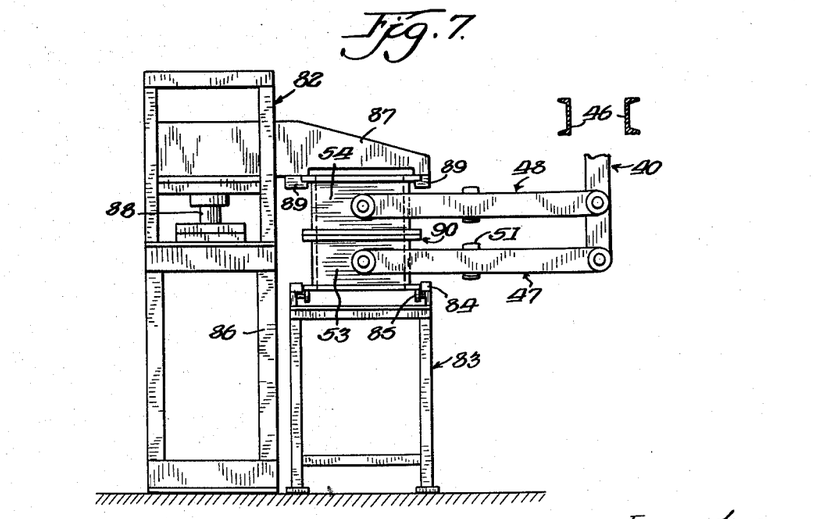

In Fig. 5, the pair of flasks 53 and 54 carried by a carrier 40 are shown as having left the forward roller conveyors 66, indicated in dotted lines, and as being again supported on the rails 61 and 63. As the movement of the flasks continues to the core setting station, the drag flask is swung from the position shown in Fig. 5 to that of Fig. 6. In this position, the drag flask may receive a core or cores 80 In the present instance, the cores are set manually, but transfer of the cores from the core conveyor 37 to the successive drag flasks coming to the core setting station may be accomplished mechanically by suitable transfer equipment. The swinging of the drag flask from one side of the carrier to the other is accomplished by suitable arrangement of the support rails 61 and 63, as hereinafter fully explained. A depression or pit 81 may be provided in the floor to accommodate the swinging of the flask, although this is determined by the relative length of the arms 49 and the level of the conveyor 20. From the core setting station, the flasks are moved to the mold closing station 23, the drag flask 53 being elevated into engagement with and under the cope flask by suitable upward inclination of the flask support rail so that both flasks are substantially horizontal and in superposed relation, the cope flask being supported on the drag flask and the latter being supported by the support rail. In this superimposed relation, the flasks come to the mold closing mechanism, generally designated 82, which includes a guide conveyor 83 similar to the conveyors 66 having edge guide means 84 between which the lower flange of the drag flask is directed and guided, and rollers 85 over which the drag flask travels between the guides. The mechanism 82 also includes a frame 86 mounting a clamping arm 87 which is vertically movable by fluid cylinder means 88 and has laterally movable clamping lugs 89 which are adapted to be moved toward each other as by cylinder means, not shown, carried by the arm 87, to engage the upper flanges of the cope flask and securely grip the same as they come to a predetermined centered position and thus bring the cope flask into precise registration with the drag flask, so that the respective locating pins and apertures of the flasks are in vertical alignment, whereupon the clamping arm 87 is moved downwardly by operation of the cylinder means 88 to lower the cope flask into tightly closed relation with the drag flask with the locating pins engaged in the holes provided therefor. If the flasks are already in this properly closed relation, no movement of the cope flask will occur by operation of the arm 87 and lugs 89, but it will be understood that because of the necessary tolerances in manufacture and wear of the parts, the two flasks will not always come into exactly closed relation as they are brought into superposed relation. In such cases, the flasks will be separated by engagement of the locating pins of one with the flange of the other, and the movement of the cope flask described will be necessary to permit proper registration of the pins and holes. It is to allow for such registering movement that the limited movement of the flasks relative to the supporting frames 47 and 48 is provided by the previously described mounting connection of the flasks on the arms 49.

Figure 8:
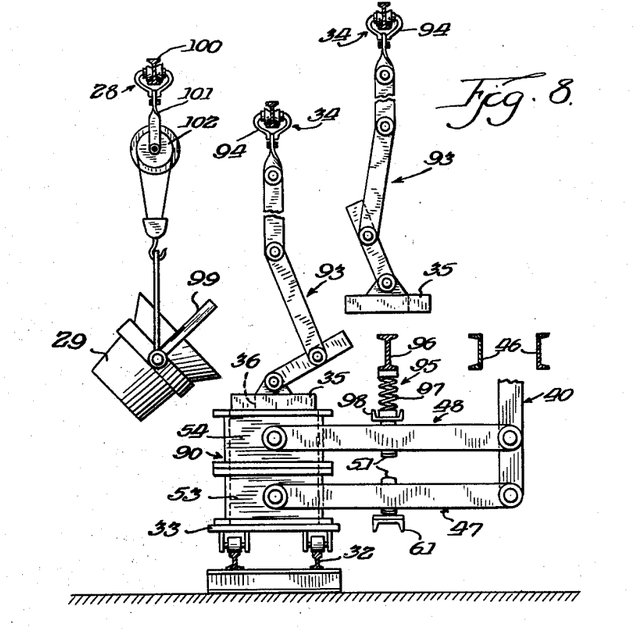

In the closed condition, forming a complete mold 90, the cope and drag flasks are moved from the mold closing mechanism 82, supported by the support rail 61 on which the roller means 51 of the drag flask support frame engage, to the pouring station 24. Between the mold closing station 23 and the pouring station 24, the conveyor 20 and support rail 61 incline downwardly to bring the closed mold 90 to the level of the carriages 33 on the track 32, so that each complete mold is deposited upon one of the carriages to be carried along the pouring station thereby, as shown in Fig. 8, one of the carriages coming to position below each mold as the latter approaches the station. The track 32 is in this case shown as having its return passing underneath the floor through a tunnel 91. The support rail 61 may be interrupted along the pouring station as shown, or may continue at a level sufficiently low to be spaced from the roller means 51 of the drag flask supporting carriage 47. As each mold is deposited on a carriage 33, one of the weights 35 is lowered onto the sand in the cope flask by movement to the lower run of its conveyor 32 so that its full weight rests on the mold during the time the mold travels along the pouring station. The weight is of substantially the same plan as the interior of the cope flask, except for the recess 36. To permit the deposition of the weight on the mold, each weight 35 is suspended from the overhead track, such as an I-beam, of conveyor 34 by a suitable linkage generally indicated at 93, which is carried by a trolley 94 running on the track. The weight holds the sand in the mold against distortion of the mold cavity by the pressure developed internally upon pouring of the molten metal thereinto.

Along the pouring station, there is also provided a closure device generally indicated at 95 for holding the flasks of each mold against separation during travel thereof along the pouring station. The closure device comprises an I-beam 96 or like member extending along the pouring station at a level above the flask supporting frames 48, and directly above the roller means 51. The beam may conveniently be supported in common with the adjacent guide rail 46. To the lower surface of the beam is secured a plurality of springs 97, in this case shown as coil springs, which carry a presser member 98, shown as a channel member, at their lower ends. The springs urge the presser member downwardly away from the beam 96 into contact with the roller means 51 of the cope flask support frames, so that each cope flask is urged downwardly into closed contact with the drag flask therebeneath.

As the molds travel along the pouring station over the track 32, the molten metal is poured thereinto from the ladles 29 which move step-by-step in step with the movement of the molds. The ladle conveyor 28 may conveniently be connected or yoked to the conveyor 20 to accomplish this, or may be independently driven with the same step-by-step timing as the conveyor 20. The ladles may be tilted manually to accomplish the pouring by means of the handles 99, as is the common practice at present, or suitable automatic means may be provided. The conveyor 28 comprises an overhead track in the form of an I-beam 100, for example, on which trolleys 101 are driven, through a suitable chain or the like. On each trolley is suspended an electric hoist 102 which through a hook or other appropriate means carries a ladle 29. The ladles are brought by the conveyor 28 to the crucibles for refilling and then carried along to the pouring run of the conveyor. The weights 35 are raised from the molds as the molds pass from the pouring station, and are returned at the higher level to engage with a mold coming to the pouring station.

Figure 9:
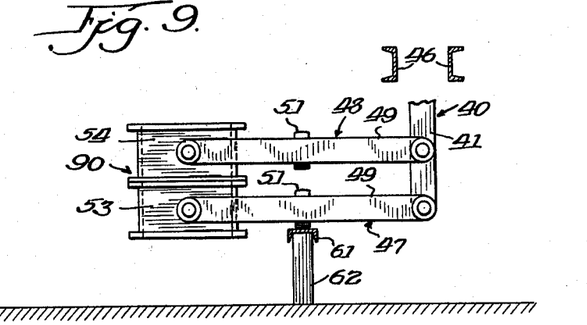
Figure 10:
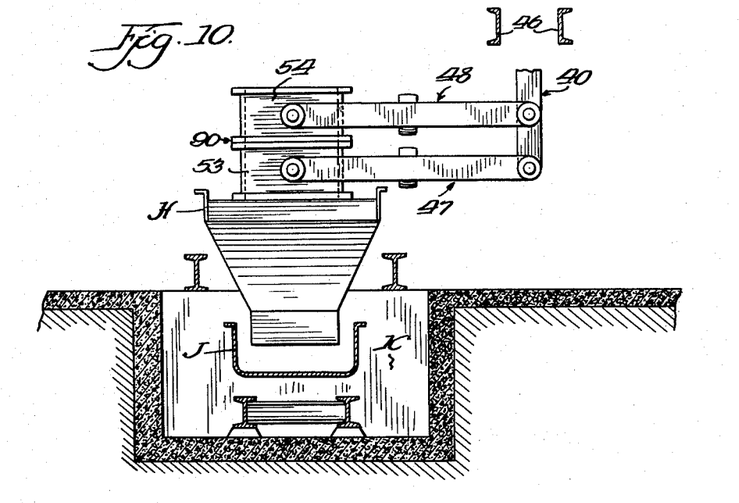

As the molds leave the pouring station, they move off the carriages 33 and come into supported engagement on the rail 61, which again begins at this point, or if continued along the pouring station, rises to such a level as to pick up the roller means 51 of the drag flask support frame 47. The molds continue supported on the rail 61 through the cooling and storage station 25 in substantially horizontal position as shown in Fig. 9, while the castings cool and harden sufficiently for removal and handling without damage. The path of travel is sufficiently long to provide the necessary period for hardening before the castings reach the shakeout station 26. If particular castings should require a longer period, or if it is desired to store the castings before they are removed from the molds, they may be transferred from the main path of the conveyor to one or more of the shunt or bypass paths 38. Suitable switch means are available for this purpose, and the molds along the shunt paths may be held stationary or moved therealong as desired, and returned to the main conveyor path when the molds are to be emptied.

Figure 11:
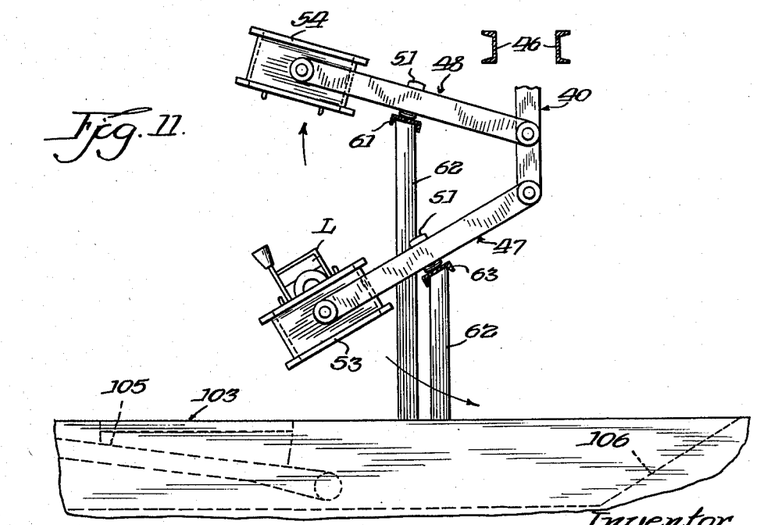

As the molds come to the shakeout station 26, they are brought to rest upon a vibratory shakeout mechanism H of any appropriate design known in the art, which by its vibration causes all or almost all of the sand to fall from the molds through the shakeout mechanism to a suitable conveyor, such as an oscillating feeder J, by which the sand may be returned to a reclaiming area. A suitable pit K may be provided for accommodating the feeder, if desired, so that the molds need not be raised to too high a level as they come from the station 25. The shakeout H and feeder J are supported above and in the pit, respectively, by any suitable frame means. The support rail 61, as already mentioned, is interrupted adjacent the shakeout station, since the molds are here supported on the shakeout mechanism. As the flasks 53 and 54 still in superimposed relation are moved from the shakeout mechanism by the conveyor 20, they are separated by raising of the cope flask and swinging of the drag flask with the casting L therein downwardly to a position at the casting removal station 27 such as shown in Fig. 11. The casting L in each drag flask may then be pulled or dumped from the flask, either manually or by any suitable mechanism, as onto the spill grate 103, adjacent which may be a core knockout area 104 at which the cores may be broken up and removed from the castings. Below the grate 103 and area 104 may be disposed a belt conveyor 105 or the like receiving sand from the feeder J and the grate 103 and area 104 to carry the same laterally of the grate for return to the sand reclaiming area. Any suitable conveyor, not shown, may be arranged adjacent the area 104 to carry the castings to a cleaning room or the like, if desired. The drag flask is then further swung counterclockwise as indicated by the arrow in Fig. 11 substantially to the position shown in Fig. 2. In the separated condition of the flasks as shown in Fig. 2, they are ready for movement to the molding station 21 to begin another cycle. The separation of the flasks and particularly the swinging of the drag flask from the cope flask side of the conveyor 20 to the other side is accomplished in substantially the same manner as the swinging of the drag flask into position beneath the cope flask adjacent the mold closing station 23, except that it is a reversal of that operation. A pit 106 similar to the pit 81 may be provided to accommodate swinging of the flask, and may be extended to provide for the conveyor 105.

Figure 12:
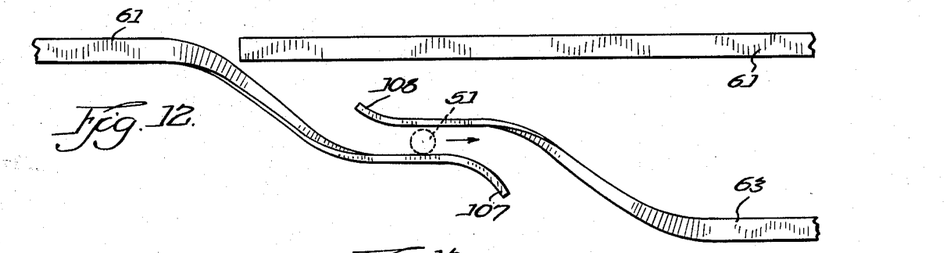
Fig. 12 is a broken plan view of the supporting rail arrangement at a flask-transposing portion thereof.

In Figs. 12 and 13, there is shown the arrangement of the support rails 61 and 63, between the casting removal station 27 and the molding station 21, by which the drag flask is swung from the cope flask side of the conveyor to the other side. The rail 61 is interrupted and the rear portion thereof is bent forwardly and downwardly and also laterally toward the drag flask side of the conveyor, to a termination 107 beyond the longitudinal mid plane of the conveyor. At the same time, the rail is twisted so as to provide a proper surface for engagement by the roller means 51 of the drag flask supporting frame 47, which in following this bent and twisted lowering part of the rail 61 brings the supporting frame 47 to a substantially vertical position depending below the hanger frame 40, as well shown in Fig. 14, and indicated by the dotted line showing of the roller means 51 in Fig. 12. The forward portion of the rail 61 continues from the interruption at a somewhat higher level than the rear portion and is spaced forwardly from the beginning of the bent lowering part of the rear portion of rail 61, so that the cope flask may be supported on the forward rail portion by engagement of the roller means 51 of the supporting frame 48 thereon. The support rail 63, which as already explained is also interrupted at the mold station roller conveyor 66, extends rearwardly parallel to the forward portion of the rail 61 and is bent downwardly and rearwardly as well as toward the cope flask side of the conveyor 20 to a termination 108 on the cope flask side of the conveyor midplane in lapped relation to the termination 107 of the rear portion of rail 61, and spaced laterally therefrom a sufficient distance to receive therebetween the roller means 51 of the drag flask of the support frame 47 and permit passage of the support frame therebetween. Adjacent the points at which the support of the drag flask is transferred from one rail to the other, the standards 62 may be modified or replaced by other suitable means so as to avoid interference with movement of the support frame 47 and flask 53. The general shape and positions of the rail portions will be evident from the plan and elevation as shown in Figs. 12 and 13. As the conveyor moves the carrier 40 forwardly, the vertically depending frame 47 is swung by means of the bent and twisted formation of the rear portion of rail 63 upwardly and away from the rail 61, until it reaches the desired level. It will be understood that the illustration in Figs. 12 and 13 of this construction is diagrammatic in nature, since the curves of the several rail portions are shown as much shaper than is actually the case, the lengths of the several rail portions relative to the lateral spacing being much greater than can be made to appear in these figures without loss of practically all detail. It will be obvious that the curvature of the rail portions transversely of the conveyor is arcuate, and that in the direction along the conveyor can be no greater than defined by the tangency to the curve at any given point of a line from the peripheral bearing point of the roller means 51 on the rail to the edge of the arms 49 of the support frame in the central radial plane of the roller means. Of course, other means for holding the flasks at desired levels or swinging the drag flask from one side to the other of the carrier might be provided, such as a system of cables and pulleys operated by motors or other suitable means.

It will be apparent that the disclosed construction and arrangement provides for automatic operation of a foundry system, while allowing certain of the molding operations to be performed manually if desired, eliminates all manual handling of molding flasks by permanent mounting thereof on a conveyor in raised relation cooperable to form complete molds while providing for all the usual molding operations, and provides for a steady repetition of the cycle of operations and consequent high production rate. It will of course be understood that the specific embodiments of the various devices and mechanisms herein may be modified in many ways, or equivalent arrangements employed therefor, without departure from the principle of the invention, and accordingly it is not intended that the invention be limited except as required by the spirit and scope of the appended claims.

I claim:
1. A substantially automatic foundry system comprising a molding station having a pair of laterally spaced molding machines each with guide conveyor means at each end thereof, a core setting station, a mold closing station having means for registering and closing into a mold a pair of superimposed mold flasks, a pouring station having a conveyor carrying ladle means for pouring molten material into closed molds moving along the station and a continuous conveyor carrying a plurality of weights each engaging on a closed mold during movement thereof along the station and also having carriage conveyor means supporting the closed molds in movement along the station and clamping means holding the superimposed flasks of the molds in tightly closed relation during said movement along the station, a cooling and storage station, a shakeout station, a casting removal station, an endless overhead conveyor extending along and moving successively past said molding, core setting, closing, pouring, cooling and storage, shakeout, and removal stations, a plurality of mold carriers engaged with said overhead conveyor each including a hanger frame depending therefrom and a pair of flask supporting frames pivoted on the hanger frame for movement in a plane transverse thereof, a cope flask and a drag flask each supported by one of the supporting frames of a carrier in limited pivotal and sliding relation thereto, antifriction roller means on each of said hanger frames and supporting frames, guide rails engaged by the hanger frame roller means for maintaining the hanger frame below the overhead conveyor, support rails engaged by the supporting frame roller means to carry the weight of the flasks and supporting frames and determine the planes thereof, the support rail for the drag flask extending only from adjacent the shakeout station forwardly relative to the direction of carrier travel to adjacent the mold closing station and adjacent the core setting station between the molding station and closing station having its forward end curved downwardly and toward the vertical plane of the cope flask support rail and terminating on the cope flask side of the plane of the hanger frame to guide the drag flask supporting frame and flask to a position depending vertically from the hanger frame, the cope flask support rail being interrupted adjacent said forward curved portion of the drag flask support rail and having its portion forwardly of the interruption disposed below the horizontal plane of its rear portion and curving rearward downwardly and toward the vertical plane of the drag flask support rail and terminating on the drag flask side of the plane of the hanger frame in laterally spaced lapping relation to the termination of the curved drag flask support rail portion to guide the drag flask supporting frame and flask from said vertically depending position to a position below and supporting the cope flask for passage in superimposed relation to said mold closing station, the drag flask support rail at its rear end curving downwardly and toward the vertical plane of the cope flask support rail and terminating on the cope flask side of the plane of the hanger frame to guide upwardly and forwardly to the drag flask support rail a drag flask supporting frame and flask from a position depending below the hanger frame, the cope flask support rail being interrupted adjacent said rear curved end of the drag flask support rail with its portion forwardly of the interruption disposed above the plane of the rearward portion and having the forward end of the rearward portion curved downwardly and toward the vertical plane of the drag flask support rail and terminating on the drag flask side of the plane of the hanger frame in spaced lapping relation to the curved rear end of the drag flask support rail to guide the drag flask support frame and flask downwardly to a position de- pending below the hanger frame, the molding station being disposed intermediate the ends of the drag flask support rail and said interruptions in the cope flask support rail with the guide conveyor means in the paths of travel of the respective flasks, the flasks of each carrier passing in superimposed relation from the closing station to the shakeout station, said conveyors and carriage conveyor means at the pouring station each having a run paralleling the run of said overhead conveyor at the pouring station with the carriage conveyor means receiving successive closed molds to support the weight thereof and of metal poured thereinto and said clamping means engaging the cope flask supporting frame to urge the cope flask downwardly against the drag flask on the carriage conveyor means for tight closing of the mold, said weight conveyor disposing a weight atop each closed mold to travel therewith along said run for counteracting pressure resulting from pouring of metal into the mold and said ladle conveyor providing for ladle travel along said run for filling of the molds, means at said cooling and storage station providing a path for the carriers shunting the overhead conveyor path and including means for shunting carriers from the conveyor path and means controlling return of shunted carriers to the overhead conveyor path, and means at said shakeout station for joggling the superimposed flasks to remove the molding sand therefrom.

2. A foundry system comprising a molding station having a pair of laterally spaced molding machines each with guide conveyors at each end thereof, a core setting station, a mold closing station having means for registering and closing into a mold a pair of superimposed mold flasks, a pouring station having a ladle conveyor carrying ladles for pouring molten metal into molds moving along the station and a weight conveyor carrying a plurality of weights engaging on closed molds during mold movement along the station and also having carriage conveyor means supporting the closed molds in movement along the station and presser means holding the molds closed during said movement along the station, a cooling station, a shakeout station, a casting removal station, endless conveyor means extending along and moving successively past said molding, core setting, closing, pouring, cooling, shakeout, and removal stations, a plurality of mold carriers on said endless conveyor means each having a pair of flask support frames pivoted to swing in a plane transverse of the endless conveyor means path, a cope flask and a drag flask each permanently mounted on one of the support frames of each carrier, roller means on each of said frames, support rails on opposite sides of the endless conveyor means engaged by said roller means to carry the weight of the flasks and support frames and determine the planes thereof, the drag flask support rail extending only from adjacent the casting removal station forwardly in the direction of carrier travel to adjacent the core setting station and having its rear end curved downwardly and rearwardly and toward the opposite side of said path to a termination on said opposite side and also adjacent the core setting stations having its forward end curved downwardly and forwardly and toward said opposite side to a termination on the opposite side, the other rail being interrupted adjacent the forward and rear ends of the drag flask support rail with the portion thereof between said interruptions disposed at a higher level than the portions rearward and forward of the interruptions and having the rearward portion curved downwardly and forwardly toward the drag flask side of said path to a termination on the drag flask side in laterally spaced lapped relation with said rear termination of the drag flask rail and also having the forward portion curved downwardly and rearwardly toward the drag flask side to a termination on the drag flask side in laterally spaced lapped relation with said forward termination of the drag flask rail, the rails being discontinuous at the molding station and the molding station being located between said forward and rear terminations with the guide conveyors thereof in the paths of the flasks to replace said rails in supporting the flasks and support frames, the flasks of each carrier moving in superimposed relation from the mold closing station to the shakeout station and between the shakeout station and molding station being brought to separated condition on opposite sides of the endless conveyor means by means of said rail arrangement adjacent the removal station and being brought to superimposed relation between the molding station and mold closing station by said rail arrangement adjacent the core setting station, said ladle and weight conveyors and carriage conveyor means paralleling the path of the endless conveyor means at the pouring station, and said presser means engaging over the uppermost flask support frame of superimposed flasks moving along the pouring station to maintain the flasks inclosed mold condition.

3. A foundry system comprising an endless conveyor, a plurality of mold carriers on said endless conveyor each having a pair of flask-carrying means pivoted thereon to swing in substantially the same plane transversely of the conveyor path with at least one of said flask-carrying means swingable from one side to the other of said path, a drag flask permanently mounted on a flask-carrying means of each carrier swingable from one side to the other and a cope flask permanently mounted on the other flask-carrying means, means for disposing said flask-carrying means of each carrier in predetermined positions in said plane and swinging the carrying means between positions with the flasks disposed on opposite sides of said path and with the flasks disposed on the same side of the path in superimposed relation, a molding station, a core setting station, a mold closing station, a pouring station, a cooling station, a shakeout station, and a casting removal station disposed successively along said path, said molding station including a pair of molding machines located to receive the cope and drag flasks when disposed on opposite sides of said path and form pattern impressions therein, said mold closing station including mechanism located to receive the flasks when disposed in superimposed relation on one side of said path and bring the flasks into closed mold condition, the flasks of each carrier being moved in closed condition along said pouring station, said pouring station including a carriage conveyor paralleling the path of said endless conveyor at the pouring station to support closed molds in movement along the station during pouring of metal thereinto and also including presser means engaging said flask-carrying means to hold the flasks in closed mold condition during passage along the pouring station.

4. A substantially automatic foundry system comprising an overhead conveyor movable step by step in a closed path, a plurality of mold carriers engaged with said conveyor for movement thereby along said path each including a hanger frame depending substantially vertically from the conveyor and a pair of flask support frames pivoted on the hanger frame disposable on opposite sides thereof, a mold flask permanently mounted in each support frame of a carrier for limited pivotal and slidable movement, one of said flasks being a cope flask and the other a drag flask, roller means on each of said hanger frames and support frames, guide rails engaged by the hanger frame roller means for maintaining the hanger frame substantially vertical, support rails extending along opposite sides of said path engaged by the flask support frame roller means to carry the weight of the flasks and supporting frames and determine the planes thereof, mold operation stations including molding core setting, mold closing, pouring, cooling and storage, shakeout, and casting removal stations arranged along said path successively in the direction of movement of the carriers, said molding station including a pair of automatic molding machines on opposite sides of said path each having a mold pattern fixed thereon and vertically movable means for positioning over and raising from the pattern a flask moved to the machine and also including supporting conveyor means forwardly and rearwardly of each machine to support a flask in movement into and out of the machine, said core setting station being located on the cope flask side of said path forwardly of the molding station, said pouring station having a plurality of endless conveyor means each with a run paralleling the run of said overhead conveyor at said station and synchronized therewith including a first conveyor receiving thereon and moving along said overhead conveyor run closed molds supported by said hanger frames and a second endless conveyor carrying plurality of ladles for pouring molten material into the closed molds on said first conveyor during movement along said run and also a third endless conveyor carrying a plurality of weights each automatically engaging on the uppermost flask of a closed mold to counteract pressure therein resulting from the material poured thereinto, the pouring station including means for clamping the upper flask of a closed mold tightly against the lower flask during movement along said run, said cooling and storage station including means providing a path for carriers shunting a portion of said overhead conveyor path and means for controlling passage of carriers along said shunting path, said shakeout station having means for jolting closed molds to remove the sand therefrom, said casting removal station being located on the cope flask side of the overhead conveyor path, said support rail on the cope flask side of the overhead conveyor path extending substantially along the entire path and being discontinuous between the rear and forward ends of the molding station and having a first interruption between the removal station and said discontinuity with the forward end of the rear rail portion at said interruption extending forwardly of the rear end of the forward portion and curving downwardly and toward the drag flask side of the overhead conveyor path to a termination on the drag flask side of the path and also having a second interruption between said discontinuity and the closing station with the rear end of the forward rail portion at the interruption extending rearwardly of the forward end of the rear portion and curving downwardly and toward the drag flask side of the overhead conveyor path to a termination on said drag flask side, the forward portion at said first interruption extending at a higher level than the rear portion and the rear portion at the second interruption being at a higher level than the forward portion, and said support rail on the drag flask side of the overhead conveyor path extending between the shakeout station and closing station and being discontinuous between the forward and rear ends of the molding station, the rear end of the rear portion curving downwardly and toward the cope flask side of the overhead conveyor path to a termination on the cope flask side thereof in lapping relation with the adjacent forward end of the rear portion of the cope flask support rail at said first interruption and the forward end of the forward portion curving downwardly and toward the cope flask side of the overhead conveyor path to a termination on the cope flask side in lapping relation to the adjacent rear end of the forward portion of the cope flask support rail at said second interruption.

5. A substantially automatic foundry system comprising an endless conveyor movable step-by-step in a closed path, a plurality of mold carriers engaged with said conveyor for movement thereby along said path each including a pivot frame connected to the conveyor and a pair of flask support frames pivoted on the pivot frame disposable on opposite sides thereof, a cope flask and a drag flask mounted one in each of the support frames of the carrier for limited pivotal and sliding movement, roller means on the support frames, support rails extending along opposite sides of said path engaged by the support frames roller means to carry the weight of the flasks and support frames and determine the planes thereof, the support rails on the cope flask side of said path extending generally along the entire path and being discontinuous for at least one portion thereof and the rails on the drag flask side of said path extending along only the portion thereof adjacent said one discontinuity of the cope flask support rails and being discontinuous for substantially the same portion as the cope flask support rail, a molding station located in said discontinuities of the rails including a pair of automatic molding machines one in each of said discontinuities each receiving one of the flasks of a carrier and forming a mold therein, means rearwardly of said molding station for swinging the drag flask support frame from engagement on the cope flask support rail with the drag flask subjacent the cope flask to supported engagement on the drag flask support rail for movement of the flasks into the respective molding machines, a mold closing station at the cope flask side of said path forward of the molding station having means for precisely registering and closely engaging with each other superimposed cope and drag flasks moving along the cope flask rail to provide a closed mold, means between the molding station and closing station for swinging the drag flask support frame from the drag flask support rail into supported engagement on the cope flask rail with the cope flask superimposed thereon for passage to the mold closing station, a pouring station along said cope flask side of the conveyor path and forward of the closing station including means engaging the upper support frames of the closed molds moving along the station for downward biasing thereof to maintain the superimposed flasks in tightly closed relation, a mold cooling and storage station extending along a considerable portion of said path on the cope flask side and forwardly of the pouring station including pathway means shunting said path and means governing passage of closed molds along said pathway means, and a shakeout station along the cope flask side of said path between said cooling station and molding station for removing substantially all of the molding sand from the closed molds moving therealong.

6. In a foundry system including a plurality of carrier means for mold flasks each having a pair of flask support frames pivoted each on an axis extending longitudinally of the direction of carrier means movement with at least one of said flask support frames being swingable from one side to the other of the carrier means and each supporting a flask adjacent its free end with roller means between said axis and flask rotatable about an axis extending transversely of said direction and also including means for moving the carrier means, support rail means for engagement by said roller means to carry the weight of the support frames and flasks and determine the planes thereof comprising a pair of support rails extending along opposite sides of the path of the carrier means, one of said rails having a portion thereof helically curved in the direction of carrier means movement downwardly and from the one rail side of said path toward the other rail to a termination on the other rail side of said path for swinging the flask support frame carried thereby to a position depending substantially vertically from said longitudinal axis upon carrier means movement, and the other rail having a portion helically curved in the same manner as said curved portion of said one rail but rearwardly of the carrier means direction to a termination in lapping relation with said one rail termination and laterally spaced therefrom on the one rail side of said path to receive the roller means of a vertically depending flask support frame from said one rail termination for bringing the support frame from the vertical position to generally horizontal position on said other rail upon continued movement of the carrier means.

7. The structure of claim 6 in which the vertical component of the rail curvature is an arc about said longitudinal axis with the distance of the roller means therefrom as radius and the lateral component is delimited by tangency therewith of a line in the central radial plane of the roller means extending from the rail-contacting point of the roller means to the edge of the support frame end.

References Cited in the file of this patent

UNITED STATES PATENTS

| | | |
|---|---|---|
| 1,276,040 | Dosch | Aug. 20, 1918 |
| 1,421,305 | Prince | June 27, 1922 |
| 1,768,359 | Hazell | June 24, 1930 |
| 1,794,334 | Haskins | Feb. 24, 1931 |
| 1,859,383 | Diver | May 24, 1932 |
| 2,134,117 | Floyd et al. | Oct. 25, 1938 |
| 2,732,584 | Bishop | Jan. 31, 1956 |
| 2,845,669 | Hackett et al. | Aug. 5, 1958 |